United States Patent
Jiang et al.

(10) Patent No.: US 6,610,198 B1
(45) Date of Patent: Aug. 26, 2003

(54) LIQUID FILTER WITH CHANGE INTERVAL INDICATOR

(75) Inventors: Zemin Jiang, Cookeville, TN (US); Ted Franklin Prater, Sparta, TN (US); John W. Clevenger, Jr., Antioch, TN (US); John Scheuren, Brentwood, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/934,576

(22) Filed: Aug. 22, 2001

(51) Int. Cl.⁷ .............................................. B01D 35/143

(52) U.S. Cl. ...................... 210/86; 210/95; 210/456; 116/227

(58) Field of Search .............................. 210/94, 95, 85, 210/86, 437, 440, 456, 767; 116/276, 268, 227

(56) References Cited

U.S. PATENT DOCUMENTS

| | | |
|---|---|---|
| 2,748,949 A | 6/1956 | James |
| 2,843,268 A | 7/1958 | Kennedy |
| 2,919,807 A | 1/1960 | Briggs |
| 3,209,520 A | 10/1965 | McKinlay |
| 3,386,230 A | 6/1968 | Reisberg et al. |
| 3,397,793 A | 8/1968 | MacDonnell |
| 3,506,475 A | 4/1970 | MacDonnell |
| 3,827,566 A | 8/1974 | Ponce |
| 4,033,881 A | 7/1977 | Pall |
| 4,058,463 A | 11/1977 | Bartik |
| 4,104,170 A | 8/1978 | Nedza |
| 4,181,514 A | 1/1980 | Lefkowitz et al. |
| 4,243,397 A | 1/1981 | Tokar et al. |
| 4,392,958 A | 7/1983 | Ganzi et al. |
| 4,464,263 A | 8/1984 | Brownell |
| 4,539,107 A | 9/1985 | Ayers |
| 4,692,175 A | 9/1987 | Frantz |
| 4,878,929 A | 11/1989 | Tofsland et al. |
| 4,882,056 A | 11/1989 | Degen et al. |
| 4,890,444 A | 1/1990 | Vander Geisen et al. |
| 4,929,354 A | 5/1990 | Meyering et al. |
| 4,950,400 A | 8/1990 | Girondi |
| 5,006,235 A | 4/1991 | Cooper |
| 5,039,413 A | 8/1991 | Harwood et al. |
| 5,071,456 A | 12/1991 | Binder et al. |
| 5,082,476 A | 1/1992 | Kahlbaugh et al. |
| 5,167,683 A | 12/1992 | Behrendt et al. |

(List continued on next page.)

FOREIGN PATENT DOCUMENTS

| | | |
|---|---|---|
| EP | 48310 | 3/1982 |
| EP | 470485 | 2/1992 |
| EP | 631803 | 1/1995 |
| EP | 711588 | 5/1996 |
| EP | 844013 | 5/1998 |
| EP | 860604 | 8/1998 |
| JP | 11253706 | 9/1999 |

*Primary Examiner*—Joseph Drodge
*Assistant Examiner*—Terry K. Cecil
(74) *Attorney, Agent, or Firm*—Andrus, Sceales, Starke & Sawall, LLP

(57) ABSTRACT

A liquid filter (10) housing an annular filter element (16) has an annular space (24) between the filter element and the housing and viewable through the housing such that an operator can see the level of liquid in the annular space as an indication of when to replace the filter element, the higher the level of liquid in the annular space the greater the pressure drop across the filter element. The rise in liquid level in the annular space is delayed for applications where the filter element is otherwise changed prematurely and has a longer life than otherwise indicated by the rising liquid level in the annular space. The delay is provided by a liquid and vapor impermeable sleeve (50) trapping vapor. In a further aspect, the sleeve is provided with apertures (70, 72, 74, 90, 92) filled by liquid-soluble buttons (76, 78, 80, 94, 96) providing filter element change interval indication, including advance sequential indication.

10 Claims, 6 Drawing Sheets

U.S. PATENT DOCUMENTS

| | | |
|---|---|---|
| 5,238,474 A | 8/1993 | Kahlbaugh et al. |
| 5,252,207 A | 10/1993 | Miller et al. |
| 5,306,321 A | 4/1994 | Osendorf |
| 5,350,515 A | 9/1994 | Stark et al. |
| 5,364,456 A | 11/1994 | Kahlbaugh et al. |
| 5,376,278 A | 12/1994 | Salem |
| 5,415,676 A | 5/1995 | Tokar et al. |
| 5,423,892 A | 6/1995 | Kahlbaugh et al. |
| 5,427,597 A | 6/1995 | Osendorf |
| 5,454,858 A | 10/1995 | Tokar et al. |
| 5,462,679 A | 10/1995 | Verdegan et al. |
| 5,507,942 A | 4/1996 | Davis |
| 5,543,047 A | 8/1996 | Stoyell et al. |
| 5,622,537 A | 4/1997 | Kahlbaught et al. |
| 5,628,916 A | 5/1997 | Stevens et al. |
| 5,660,729 A | 8/1997 | Baumann |
| 5,669,949 A | 9/1997 | Dudrey et al. |
| 5,672,399 A | 9/1997 | Kahlbaugh et al. |
| 5,690,765 A | 11/1997 | Stoyell et al. |
| 5,695,637 A | 12/1997 | Jiang et al. |
| 5,700,304 A | 12/1997 | Foo |
| 5,736,044 A | 4/1998 | Proulx et al. |
| 5,762,669 A | 6/1998 | Kahlbaugh et al. |
| 5,762,670 A | 6/1998 | Kahlbaugh et al. |
| 5,766,449 A | 6/1998 | Davis |
| 5,766,468 A | 6/1998 | Brown et al. |
| 5,779,900 A | 7/1998 | Holm et al. |
| 5,792,227 A | 8/1998 | Kahlbaugh et al. |
| 5,797,973 A | 8/1998 | Dudrey et al. |
| 5,800,581 A | 9/1998 | Gielink et al. |
| 5,800,587 A | 9/1998 | Kahlbaugh et al. |
| 5,814,219 A | 9/1998 | Friedmann et al. |
| D402,361 S | 12/1998 | Nepsund et al. |
| D404,807 S | 1/1999 | Nepsund et al. |
| 5,858,044 A | 1/1999 | Nepsund et al. |
| 5,858,224 A | 1/1999 | Schwandt et al. |
| 5,871,557 A | 2/1999 | Tokar et al. |
| D406,315 S | 3/1999 | Rao et al. |
| D406,316 S | 3/1999 | Rao et al. |
| 5,876,601 A | 3/1999 | Geibel et al. |
| D407,808 S | 4/1999 | Nepsund et al. |
| 5,935,284 A | 8/1999 | Tokar et al. |
| RE37,165 E | 5/2001 | Davis |
| 2002/0125178 A1 * | 9/2002 | Smith et al. |

* cited by examiner

LIQUID FILTER WITH CHANGE INTERVAL INDICATOR

BACKGROUND AND SUMMARY OF THE INVENTION

The invention relates to liquid filters, and more particularly to a service interval change indicator more accurately reflecting filter life.

Liquid filters, including fuel filters, typically have a vertically axially extending housing having an annular filter element extending axially between top and bottom ends and having an inner hollow interior and an outer annular space between the filter element and the housing. The housing has an inlet to the annular space, and an outlet from the hollow interior. Liquid is filtered by flowing from the annular space through the filter element into the hollow interior. The annular space is viewable through the housing, e.g. through a transparent housing side wall, such that an operator or service technician can see the level of liquid in the annular space as an indication of when to replace the filter element. The higher the level of liquid in the annular space the greater the pressure drop across the filter element and hence the greater the plugging of the filter element.

In many applications, the liquid or fuel level, including the rise thereof in the noted annular space, does not accurately reflect filter life. For example, in one application, fuel level in a clear housing reaches the top with 2" Mercury, Hg, restriction, while the filter element is capable of 8" Mercury, Hg, restriction. Hence, using fuel level in the noted annular space of the clear housing as an indicator to change the filter element results in a premature such change. This is objectionable because of the less than full life usage of the filter element, the more frequent filter element changes, and the corresponding higher overall cost thereof.

The present invention addresses and solves the above noted objections. In one aspect, the invention delays the rise in liquid level in the noted annular space to correct the otherwise premature indication of a need to change the filter element. In another aspect, liquid level in the noted annular space is allowed to rise to controlled levels providing advance and more accurate indication of a forthcoming need to change the filter element.

DETAILED DESCRIPTION

Prior Art

Figure 1:
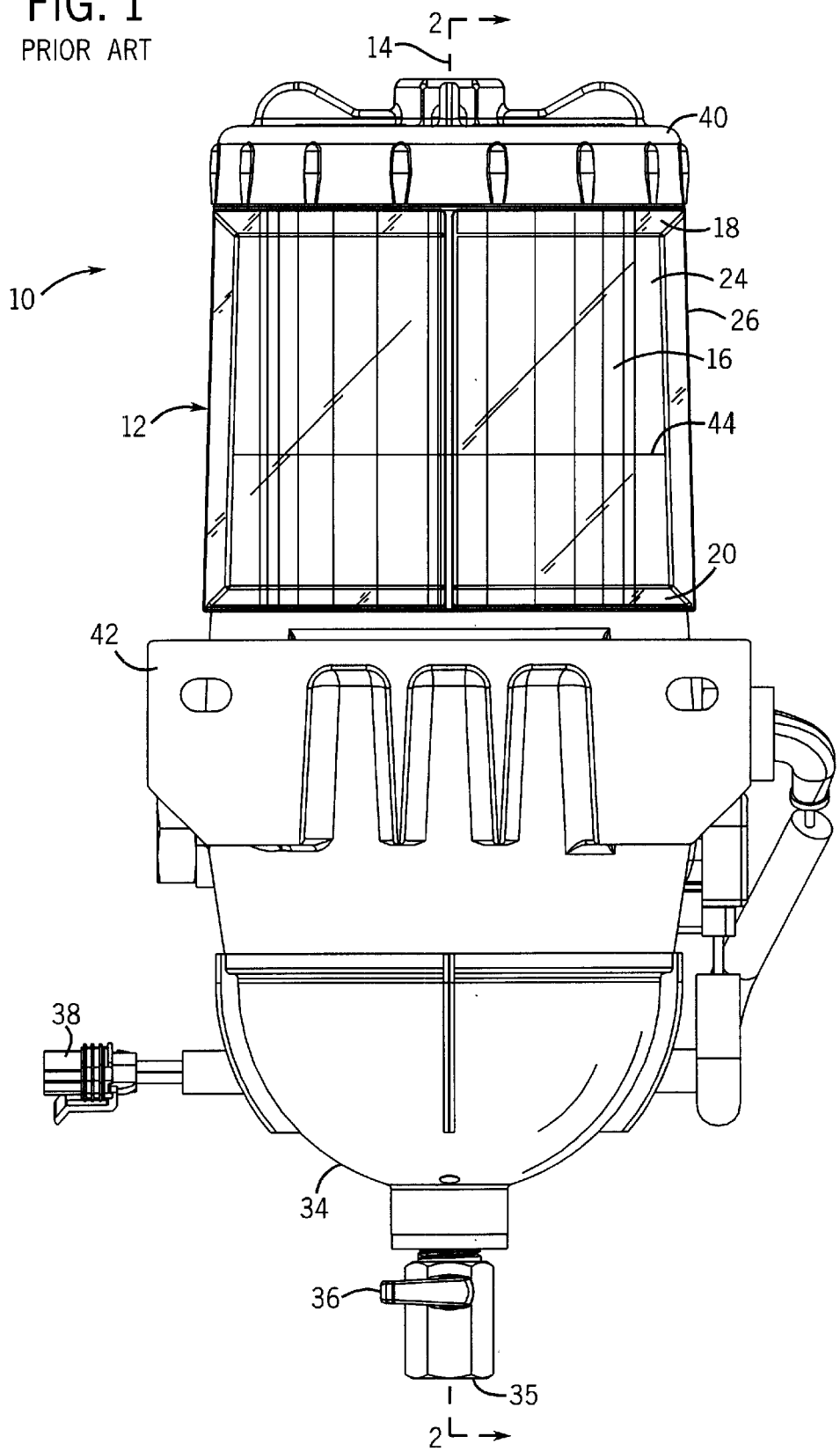
FIG. 1 is a side elevation view of a liquid filter known in the prior art.
Figure 2:
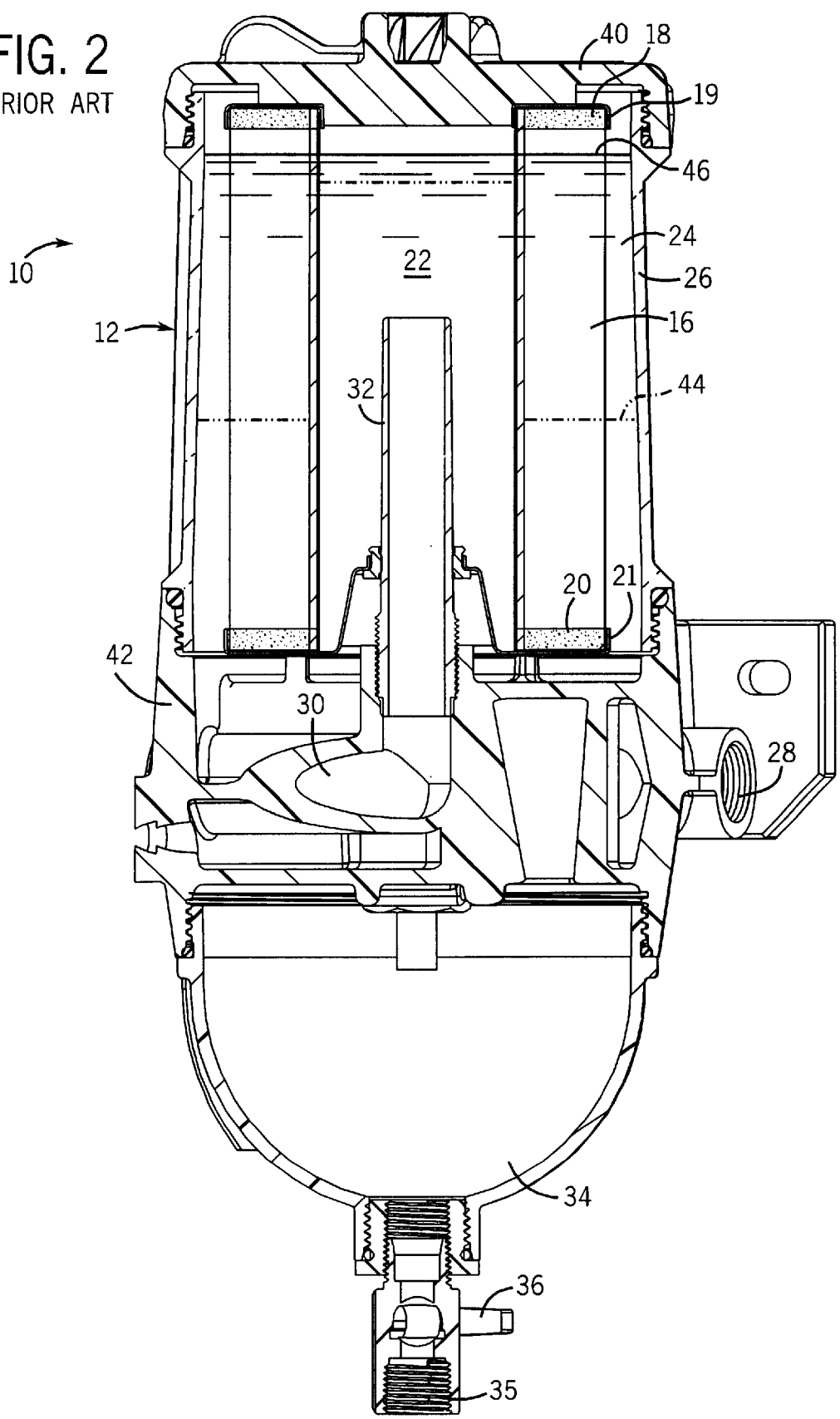
FIG. 2 is a sectional view taken along line 2—2 of FIG. 1.
Figure 3:
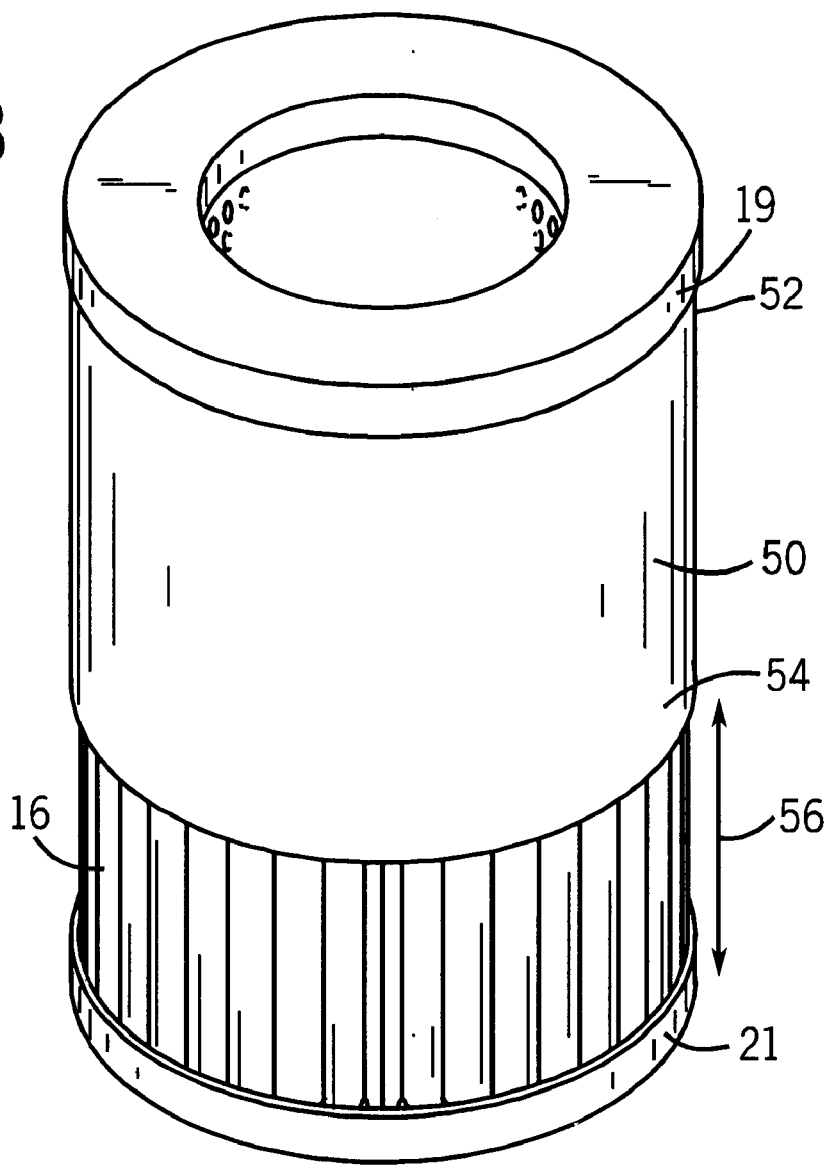
FIG. 3 is a perspective view of a filter element in accordance with the invention.
Figure 4:
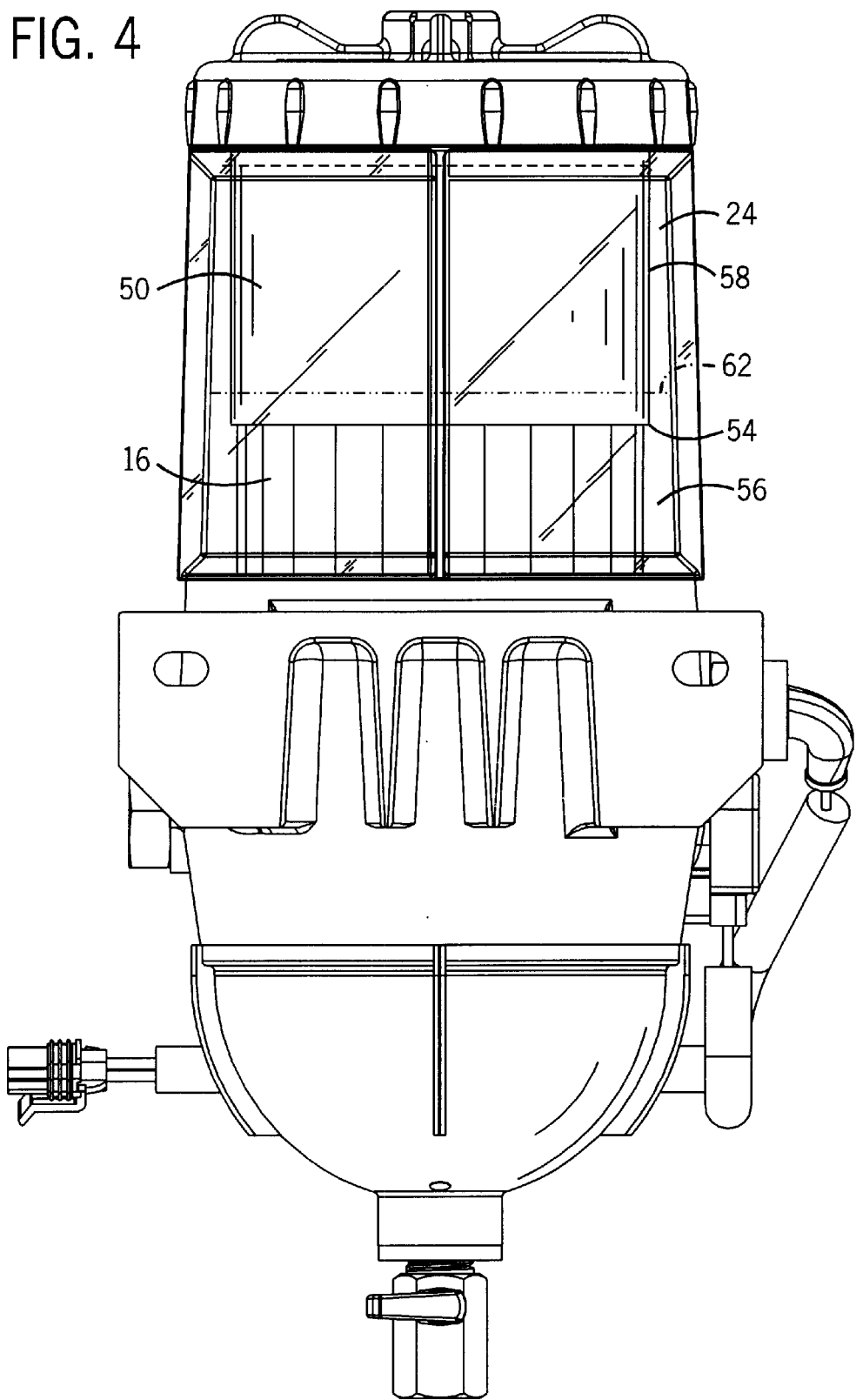
FIG. 4 is a view like FIG. 1 but incorporating the filter element of the present invention.

FIG. 1 shows a liquid filter 10, for example a diesel fuel filter, known in the prior art. The filter includes a housing 12 extending along a generally vertical axis 14 and having an annular filter element 16 extending axially between top and bottom ends 18 and 20 at respective upper and lower end caps 19 and 21, FIG. 2, and having an inner hollow interior 22, FIG. 2, and an outer annular space 24 between filter element 16 and side wall 26 of housing 12. The housing has a lower inlet 28, FIG. 2, to annular space 24, and a lower outlet 30 from hollow interior 22 through outlet tube 32. In the case of a diesel fuel filter, the housing may include a lower collection bowl or reservoir 34 for collecting coalesced separated water or contaminants for drainage at drain outlet 35 as controlled by valve 36, and may have an electrical connection 38 for an internal heater, and so on, as is known.

Housing 12 includes the noted cylindrical sidewall 26 closed at its top end by upper end cap 40 in threaded relation, and closed at its bottom end at housing base 42 in threaded relation. Sidewall 26 is clear or transparent, and hence annular space 24 is viewable through the housing such that an operator or service technician can see the level of liquid such as 44, FIG. 1, in annular space 24. When the liquid rises from level 44, as shown in dashed line in FIG. 2, to level 46, the operator or service technician can see such level and the change thereof as an indication of when to replace filter element 16. The higher the level of liquid in annular space 24 the greater the pressure drop across filter element 16 and hence the greater the plugging of filter element 16. Unfortunately, it has been found in numerous applications that such liquid level rise from 44 to 46 does not correspond to expired filter life. Hence, the filter element is being changed prematurely, and has a longer life than otherwise indicated by the noted rising liquid level in annular space 24.

Present Invention

FIGS. 3–8 illustrate the present invention and use like reference numerals from above where appropriate to facilitate understanding. The invention is illustrated in the context of the above noted known diesel fuel filter, though the invention is not limited thereto.

The present invention delays the rise of fluid level in annular space 24 for applications where filter element 16 is otherwise changed prematurely and has a longer life than otherwise indicated by the noted rising liquid level in annular space 24. The liquid gives off vapor in the housing, including in annular space 24. This aspect is utilized in the present invention. The noted delay is provided by a delay member in the form of a vapor and liquid impermeable sleeve 50 around filter element 16 and having a top end 52 at the top end of the filter element and having a bottom end 54 spaced from the bottom end of the filter element by an axial gap 56. The sleeve has an outer face 58, FIGS. 4, 6, facing annular space 24, and an inner face 60 facing filter element 16. Liquid and vapor flow from annular space 24 radially inwardly through axial gap 56 and radially inwardly through filter element 16 thereat, and also flow axially along inner face 60 of sleeve 50 and radially inwardly through filter element 16 thereat. When the liquid level in annular space 24 rises above bottom end 54 of sleeve 50, as shown at level 62, FIGS. 4, 6, vapor above level 62 can no longer flow through axial gap 56 and is trapped in annular space 24 above bottom end 54 of sleeve 50 due to the vapor impermeability of sleeve 50. Further rise of liquid level in annular space 24 must compress trapped vapor therein, thus slowing and delaying the rise of liquid level in annular space 24.

Figure 5:
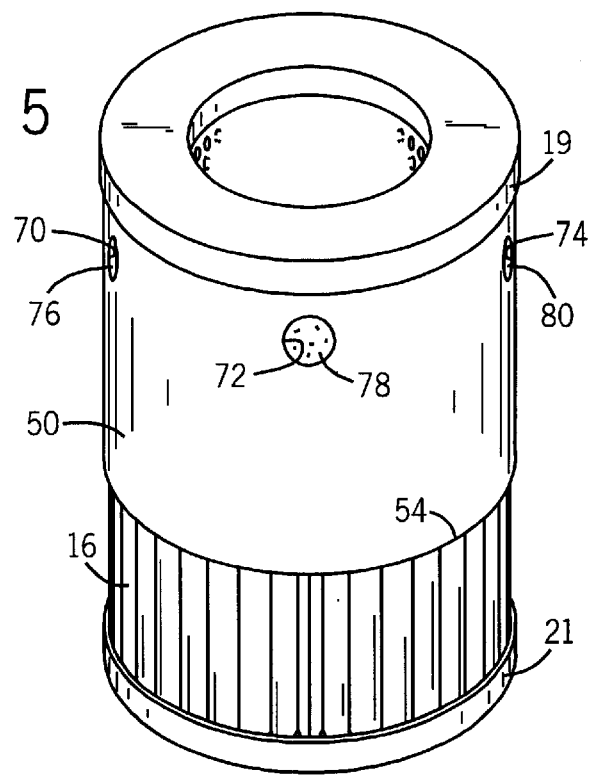
FIG. 5 is a view like FIG. 3 and shows a further embodiment.
Figure 6:
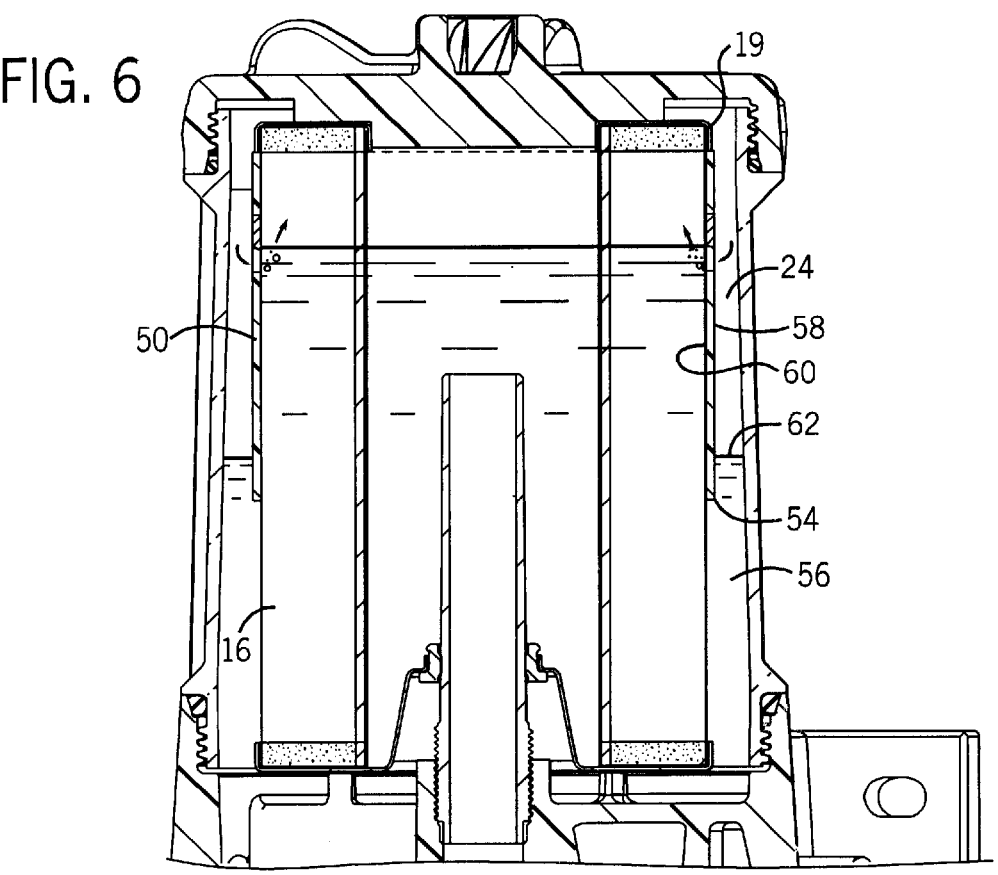
FIG. 6 is a view like FIG. 2 but incorporating the filter element of FIG. 5.
Figure 7:
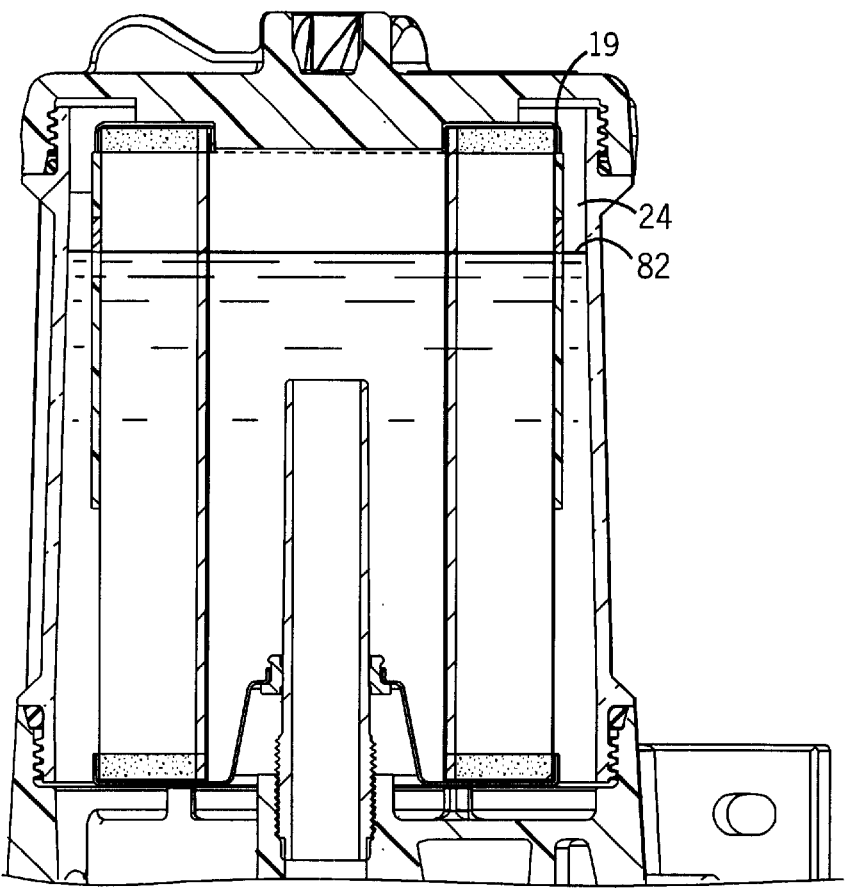
FIG. 7 is like FIG. 6 and shows a further stage of operation.

In a further embodiment, FIG. 5, sleeve 50 has one or more apertures therein such as 70, 72, 74, etc. at respective given locations therealong, each having a respective liquid-soluble button 76, 78, 80, respectively, for example a fuel-soluble button made of polyisobutylene, for example available from Lubrizol under Part Number OS158536. The button initially closes the respective aperture, and then is dissolved after a given time by contact with the liquid flowing along inner face 60 of sleeve 50, such that vapor in annular space 24 may pass through the aperture vacated by the button, FIG. 6, whereafter the liquid level rises in annular space 24 from level 62, FIG. 6, to level 82, FIG. 7. The noted given time is preferably selected to be the filter element change interval, e.g. by matching dissolution rate of the material and/or thickness to the desired interval. Upon dissolution of the button and passing of vapor from annular space 24 through the respective aperture in sleeve 50, the rising liquid level in annular space 24 provides an indication to the operator to change filter element 16.

Figure 8:
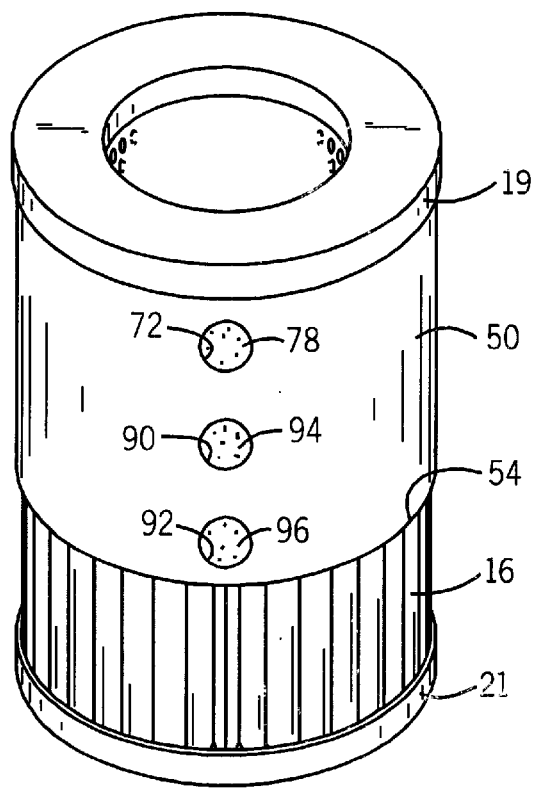
FIG. 8 is like FIG. 5 and shows a further embodiment.

In a further embodiment, FIG. 8, sleeve 50 has a further plurality of apertures such as 90, 92 each filled with a respective liquid-soluble button 94, 96 and axially spaced from bottom end 54 of sleeve 50 by differing axial spacings. Buttons 96, 94, 78 have differing dissolution rates, e.g. by differing thicknesses and/or differing material selection. A first of the buttons such as 96 closest to bottom end 54 of sleeve 50 has the fastest dissolution rate and dissolves first such that liquid level in annular space 24 rises to a respective first aperture 92 vacated by first button 96. This provides a first advance indication of a forthcoming need for a filter element change. A second of the buttons such as 94 is spaced axially farther from bottom end 54 of sleeve 50 than first button 96 and has a slower dissolution rate and dissolves second such that the liquid level in annular space 24 further rises to a respective second aperture 90 vacated by second button 94. This provides a second sequential indication of an oncoming need for a filter element change.

It is recognized that various equivalents, alternatives and modifications are possible within the scope of the appended claims. For example, annular includes other closed-loop configurations, such as ovals, racetracks, etc.

What is claimed is:

1. A liquid filter comprising an axially extending housing having an annular filter element extending axially between top and bottom ends and having an inner hollow interior and an outer annular space between said filter element and said housing, wherein said housing has an inlet to said annular space, and an outlet from said hollow interior, wherein liquid is filtered by flowing from said annular space through said filter element into said hollow interior, said annular space being viewable through said housing such that an operator can see the level of liquid in said annular space, said liquid giving off vapor within said housing, a vapor and liquid impermeable outer wrap sleeve around said filter element and having a top end at said top end of said filter element and having a bottom end spaced from said bottom end of said filter element by an axial gap, said sleeve having an outer face facing said annular space, and an inner face facing said filter element, wherein said liquid and said vapor flow from said annular space radially inwardly through said axial gap and radially inwardly through said filter element thereat and also flow axially along said inner face of said sleeve and radially inwardly through said filter element thereat, and when liquid level in said annular space rises above said bottom end of said sleeve, said vapor can no longer flow through said axial gap and is trapped in said annular space above said bottom end of said sleeve due to the vapor impermeability of said sleeve, said sleeve having at least one aperture therein at a given location therealong, a liquid-soluble button initially closing said aperture and then dissolved after a given time by contact with said liquid flowing along said inner face of said sleeve, such that vapor in said annular sleeve may pass through said aperture in said sleeve vacated by said button, and liquid level rises in said annular space.

2. The filter according to claim 1 wherein said given time is selected to be the filter element change interval, such that upon said dissolving of said button and said passing of vapor from said annular space through said aperture in said sleeve, said rising liquid level in said annular space provides an indication to the operator to change the filter element.

3. The filter according to claim 1 comprising a plurality of said apertures each proximate said top end of said sleeve and each filled with a liquid-soluble button.

4. The filter according to claim 1 comprising a plurality of said apertures each filled with a liquid-soluble button and axially spaced from said bottom end of said sleeve by differing axial spacings.

5. The filter according to claim 4 wherein said buttons have differing dissolution rates, with a first of said buttons closest to said bottom end of said sleeve having the fastest dissolution rate and dissolving first such that liquid level in said annular space rises to a respective first of said apertures vacated by said first button, to provide a first advance indication of a forthcoming need for a filter element change, a second of said buttons axially spaced farther from said bottom end of said sleeve than said first button and having a slower dissolution rate and dissolving second such that said liquid level in said annular space further rises to a respective second of said apertures vacated by said second button, to provide a second indication of an oncoming need for a filter element change.

6. A method for filtering liquid in a liquid filter having an axially extending housing having an annular filter element extending axially between top and bottom ends and having an inner hollow interior and an outer annular space between said filter element and said housing, wherein said housing has an inlet to said annular space, and an outlet from said hollow interior, wherein liquid is filtered by flowing from said annular space through said filter element into said hollow interior, said annular space being viewable through said housing such that an operator can see the level of liquid in said annular space, said liquid giving off vapor within said housing, said method comprising providing a vapor and liquid impermeable sleeve around said filter element and having a top end at said top end of said filter element and having a bottom end spaced from said bottom end of said filter element by an axial gap, providing said sleeve with an outer face facing said annular space, and an inner face facing said filter element, flowing liquid and vapor from said annular space radially inwardly through said axial gap and radially inwardly through said filter element thereat, and also flowing said liquid and said vapor axially along said inner face of said sleeve and radially inwardly through said filter element thereat, such that when liquid level in said annular space rises above said bottom end of said sleeve, said vapor can no longer flow through said axial gap and is trapped in said annular space above said bottom end of said sleeve due to the vapor impermeability of said sleeve, providing said sleeve with at least one aperture therein at a given location therealong, and providing a liquid-soluble button initially closing said aperture and then dissolved after a given time by contact with said liquid flowing along said inner face of said sleeve, such that vapor in said annular space may pass through said aperture in said sleeve vacated by said button, and liquid level rises in said annular space.

7. The method according to claim 6 comprising selecting said given time to be the filter element change interval, such that upon dissolving of said button and said passing of vapor from said annular space through said aperture in said sleeve, said rising liquid level in said annular space provides an indication to the operator to change the filter element.

8. The method according to claim 6 comprising providing a plurality of said apertures each proximate said top end of said sleeve and each filled with a liquid-soluble button.

9. The method according to claim 6 comprising providing a plurality of said apertures each filled with a liquid-soluble button, and axially spacing said apertures and said buttons from said bottom end of said sleeve by differing axial spacings.

10. The method according to claim 9 comprising:

providing said buttons with differing dissolution rates;

providing a first of said buttons closest to said bottom end of said sleeve with the fastest dissolution rate and dissolving first such that liquid level in said annular space rises to a respective first of said apertures vacated by said first button;

providing a first advance indication of a forthcoming need for a filter element change according to said rise of liquid level in said annular space to said first aperture;

providing a second of said buttons axially spaced farther from said bottom end of said sleeve than said first button and with a slower dissolution rate than said first button and dissolving second such that liquid level in said annular space further rises to a respective second of said apertures vacated by said second button;

providing a second indication of an oncoming need for a filter element change according to said liquid level rise in said annular space to said second aperture.

* * * * *